T. S. Bell,
Pruning Implement,
No. 78,918.     Patented June 16, 1868.
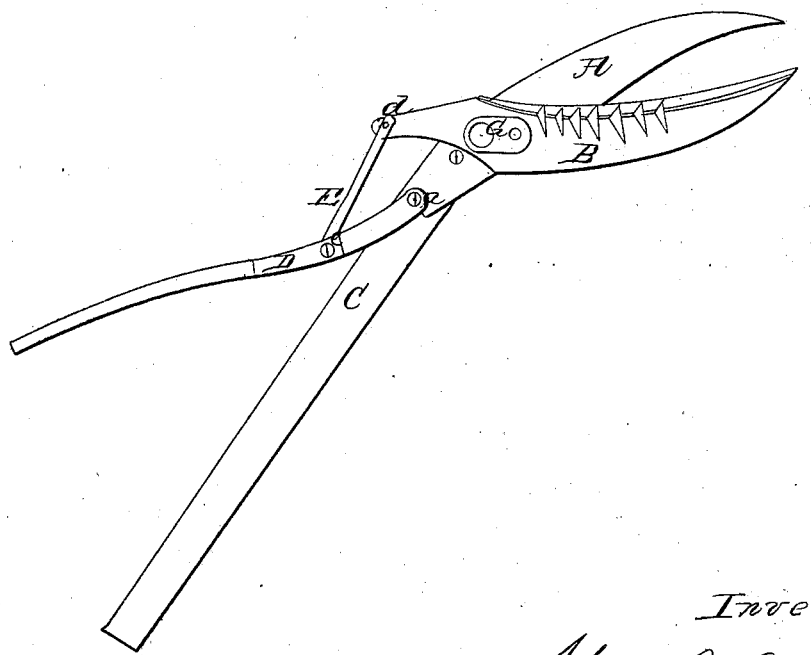
Witnesses.
Inventor.
Thos S Bell
per
Alexander Mason
Atty

United States Patent Office.

THOMAS S. BELL, OF WAPELLO, IOWA, ASSIGNOR TO HIMSELF, G. R. REED, AND J. S. ANDREWS, OF LOUISA COUNTY, IOWA.

Letters Patent No. 78,918, dated June 16, 1868.

IMPROVEMENT IN PRUNING-SHEARS.

The Schedule referred to in these Letters Patent and making part of the same.

TO ALL WHOM IT MAY CONCERN:

Be it known that I, THOMAS S. BELL, of Wapello, in the county of Louisa, and in the State of Iowa, have invented a certain new and useful Improvement in Shears; and do hereby declare that the following is a full, clear, and exact description thereof, reference being had to the accompanying drawings, and to the letters of reference marked thereon.

In the annexed drawings, making part of this specification, A and B represent the two blades of a pair of shears, which are pivoted together as seen at $x$. The blade A has secured to it a handle, C.

D represents a handle, which is pivoted to the handle C at $a$, and is connected to the blade B by means of the connecting-bar E.

The bar E is pivoted to the outer end of blade B at $d$, and to the handle D at $e$.

By this mode of connecting the blades and handles, a compound lever is obtained for opening and closing the blades, and they may thus be operated with great power.

The bevelled portions of the blades are serrated near their cutting-edges, so as to keep them from slipping upon the wood in cutting.

A plate, G, with a hole in it, is secured to the shears by the rivet which confines them together, and a strap is inserted in this hole to steady the shears, and support them at a uniform height when trimming the top of a hedge or other level surface.

What I claim as new, is—

The blades A and B, serrated on their bevelled sides, and connected at their rear ends, and operated by means of the handles C and D and bar E, substantially as and for the purpose set forth.

In testimony that I claim the foregoing, I have hereunto set my hand, this 5th day of October, 1867.

THOMAS S. BELL.

Witnesses:
VINTON MASSIE,
C. P. LACEY.